United States Patent [19]

Kooistra

[11] Patent Number: 5,228,718
[45] Date of Patent: Jul. 20, 1993

[54] AIR BAG AND WALKING BEAM CONSTRUCTION

[76] Inventor: James T. Kooistra, Box 1712, Swan River, Manitoba, Canada, R0C 1Z0

[21] Appl. No.: 878,299

[22] Filed: May 6, 1992

[30] Foreign Application Priority Data

May 7, 1991 [CA] Canada ................................ 2041998

[51] Int. Cl.⁵ .............................................. B60G 5/00
[52] U.S. Cl. .................................................... 280/678
[58] Field of Search ................................ 280/677, 678

[56] References Cited

U.S. PATENT DOCUMENTS

| | | | |
|---|---|---|---|
| 2,907,577 | 10/1959 | Weiss | 280/603 |
| 3,147,024 | 9/1964 | Brockman | 280/81.1 |
| 3,162,465 | 12/1964 | Vaugoyeau | 280/678 |
| 3,197,231 | 7/1965 | Holzman | 280/683 |
| 3,653,683 | 4/1972 | Hendrickson | 280/713 |
| 4,061,361 | 12/1977 | Felburn | 280/681 |
| 4,072,322 | 2/1978 | Fuchs et al. | 280/713 |
| 4,136,893 | 1/1979 | Sweet et al. | 280/678 |
| 4,155,570 | 5/1979 | Wiley, Jr. | 280/677 |
| 4,736,958 | 4/1988 | Armstrong | 280/840 |

FOREIGN PATENT DOCUMENTS 993462 7/1976 Canada .
2088298 6/1982 United Kingdom ................ 280/677

Primary Examiner—Tamara L. Graysay
Attorney, Agent, or Firm—Stanley G. Ade; Murray E. Thrift; Adrian D. Battison

[57] ABSTRACT

A set of bag carrying saddles replace the leaf springs of conventional walking beam assemblies and operate in conjunction with a pair of linear stabilizing arms and shock absorbers thereby giving a traction distribution of approximately 25% per wheel. The use of walking beams in conjunction with shock absorbers gives a suspension system particularly suitable for extremely rough terrain because it operates on an approximate 2:1 ratio with the air bags. The saddles include vertical side plates having diagonal forwardly and upwardly extending front portions pivotally mounted to each chassis member of the vehicle and which are also pivotally connected to the walking beams intermediate the ends of the beams. Air bags operatively extend between the saddles and the chassis members.

19 Claims, 3 Drawing Sheets

AIR BAG AND WALKING BEAM CONSTRUCTION

BACKGROUND OF THE INVENTION

This invention relates to new and useful improvements in suspension systems for trucks, trailers and the like and is particularly suited for use over rough and uneven ground such as off-road conditions although of course it may be used on conventional roads as well as logging and oil well access roads.

Conventionally, such trucks and trailers are either mounted on rear wheels supported by air bags or alternatively, utilize a walking beam construction such as a Hendrickson walking beam assembly in conjunction with steel leaf springs. In this regard U.S. Pat. No. 3,653,683 R. T. Hendrickson dated Apr. 4, 1972 is relevant and is hereby incorporated by reference.

While satisfactory under normal conditions, air bags which are usually on a 1:1 ratio, have to be relatively large in order to absorb the relatively large vertical movements of the wheel assemblies under such conditions. If standard air bags are used, there is a considerable amount of bounce which occurs and which of course is detrimental both to the load being carried and to the actual suspension and chassis system of the truck or trailer.

Conventional walking beams, particularly when used under rough ground or road conditions, have traction difficulties because of the rapid changing of traction distribution which once again is particularly hard on the transmission as well as on the suspension.

The present invention overcomes these disadvantages and basically replaces the steel springs on the Hendrickson walking beam type suspension, with air bags.

In doing so, it creates a complete air suspension with various significant advantages over conventional air suspension, the single most important being almost perfect traction distribution of 25% per wheel.

Also, retention of the walking beam characteristic gives an approximate 2:1 ratio of wheel travel to air bag travel as opposed to the nearly 1:1 ratio on conventional air suspensions.

Use of walking beams in conjunction with shock absorbers that also work on a 2:1 ratio with the air bags, may assist in producing a total suspension capable of negotiating extremely rough terrain such as off-road applications, gravel hauling and the like whereas other air suspensions have neither the traction nor flexibility to function.

In accordance with the invention there is provided a walking beam wheel assembly for trucks, trailers and the like which include spaced and parallel, longitudinally extending chassis members;

said walking beam wheel assembly comprising in combination a ground engaging wheel trolley component including a pair of spaced and parallel transversely extending wheel axles with ground engaging wheels on each end thereof, a longitudinally extending walking beam extending between the wheels on each same end of said axles and means operatively connecting said walking beams one to each of said chassis members, said means including at least one air bag operatively extending between each of said beams and the corresponding chassis member.

Another advantage of the suspension is that it may be used with shock absorbers, height control valves for the air bags, and linear stabilizers all of which assist in providing a unique and very practical suspension system.

A still further advantage of the invention is to provide a device of the character herewithin described which can either be incorporated in the original construction or which is readily adapted for retro-fitting with the minimum of changes being required.

A still further advantage of the invention is to provide a device of the character herewithin described which is simple in construction, economical in manufacture and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
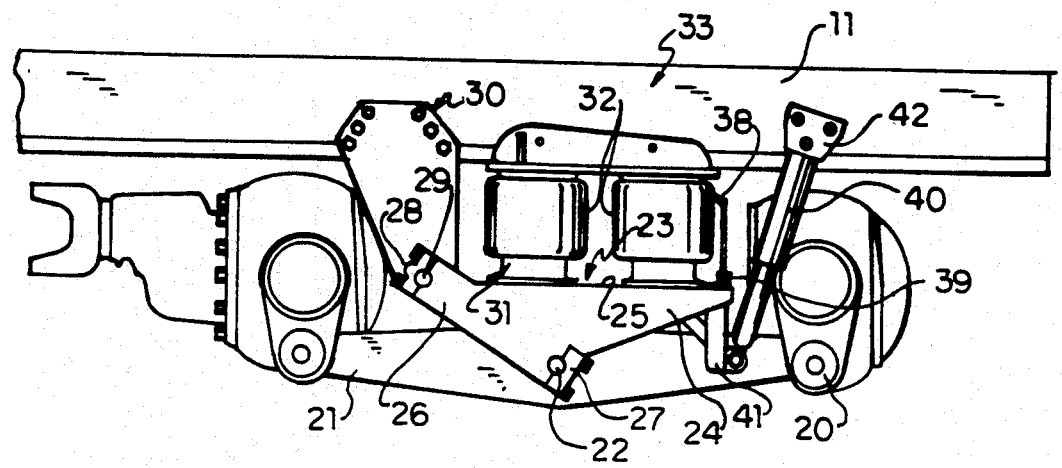
FIG. 1 is a fragmentary side elevation of one walking beam assembly attached to a truck or trailer chassis frame member.
Figure 2:
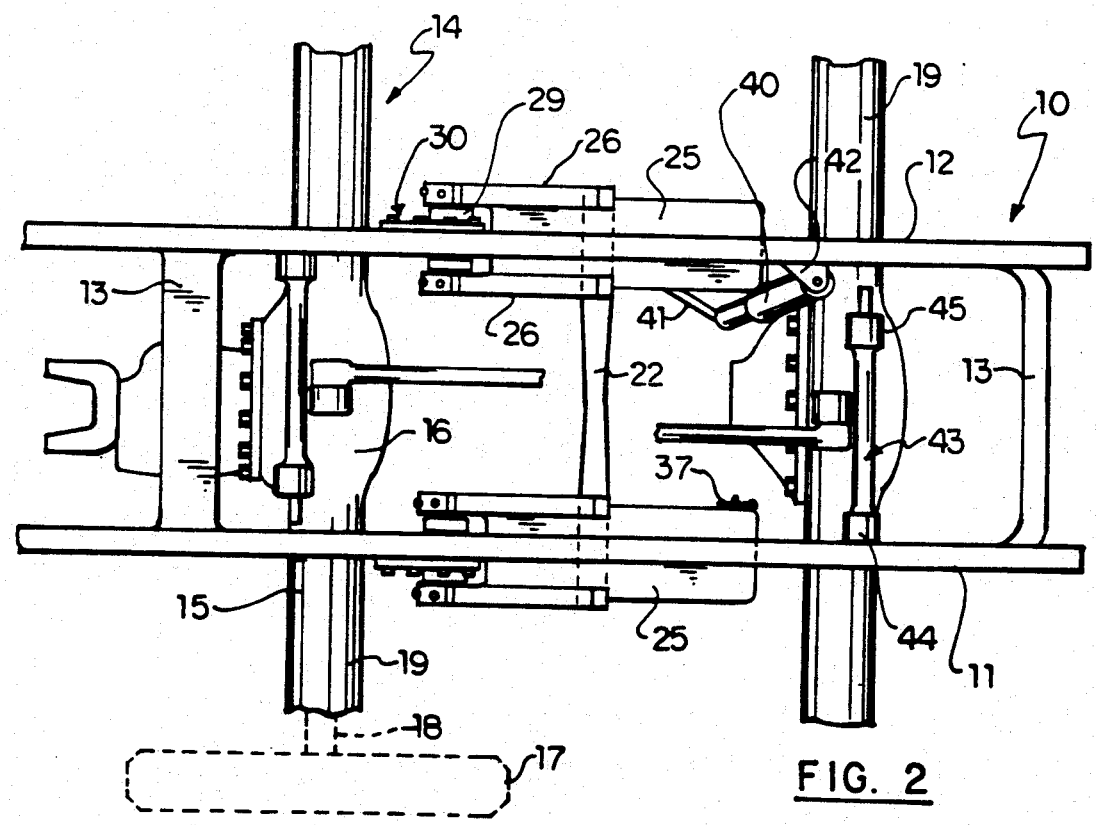
FIG. 2 is a fragmentary top plan view of the chassis showing the invention installed thereon.
Figure 3:
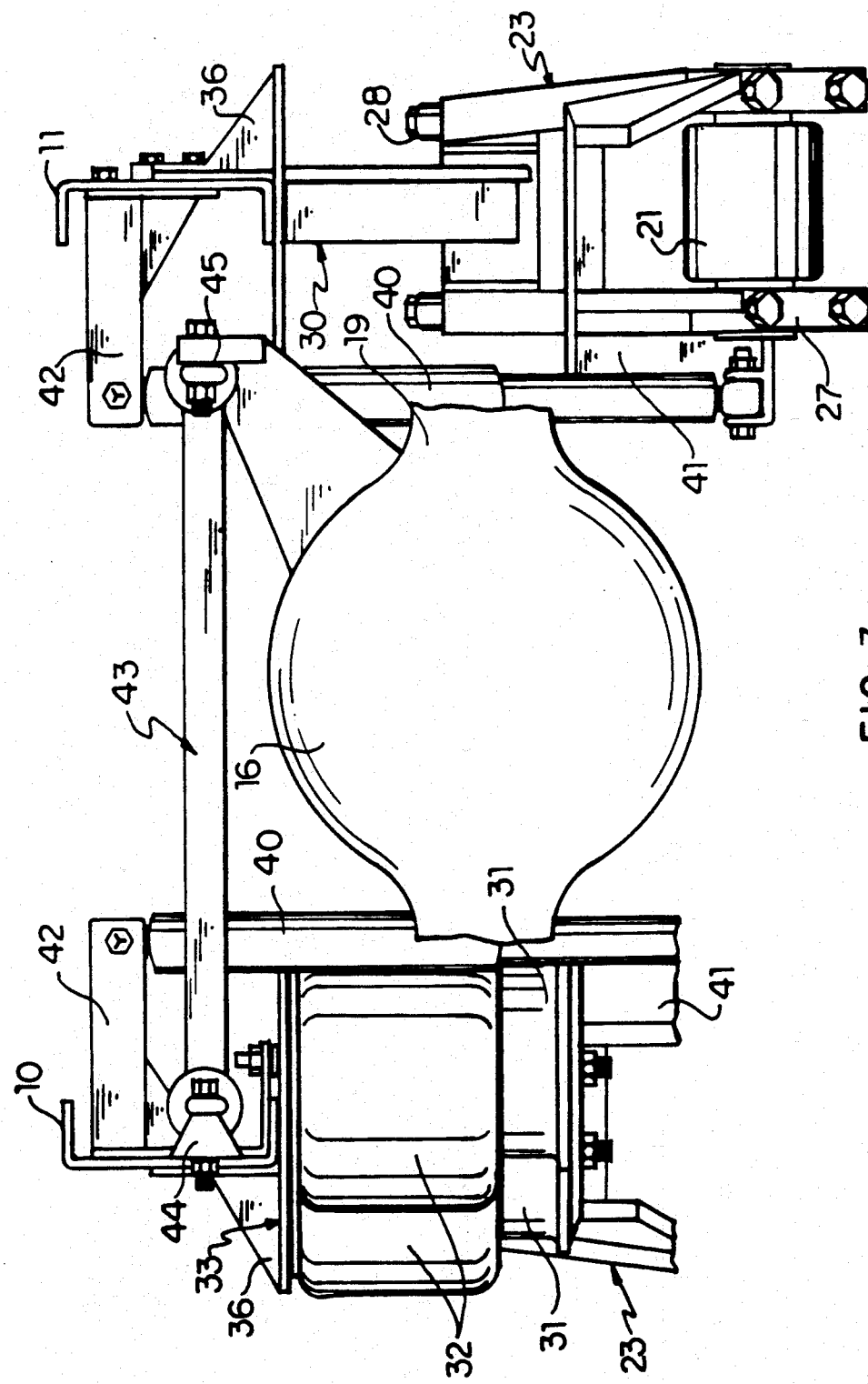
FIG. 3 is a fragmentary rear view of FIG. 2.

Proceeding therefore to describe the invention in detail, reference should first be made to FIGS. 1, 2 and 3 in which reference character 10 illustrates in general, a truck or trailer frame which includes a pair of spaced and parallel, longitudinally extending chassis members 11 and 12 and including cross members 13 maintaining the members 11 and 12 in the desired relationship one with the other.

The invention includes a wheel trolley component collectively designated 14 which includes a pair of transverse spaced apart drive axles 15 including differentials 16 and having conventional ground engaging wheels 17 journalled for rotation upon axles 18 mounted within the casings 19 which are conventional.

These transversely situated axle assemblies 14 are pivotally mounted as at 20 upon each end of a pair of walking beams 21 which are also conventional in construction. The walking beams in turn are mounted upon a transverse pivot 22 intermediate the ends thereof, said pivot extending transversely across the chassis between the two walking beams 21.

A main saddle component collectively designated 23 mounts each end of the pivot shaft 22 and hence the walking beam assemblies.

Figure 4:
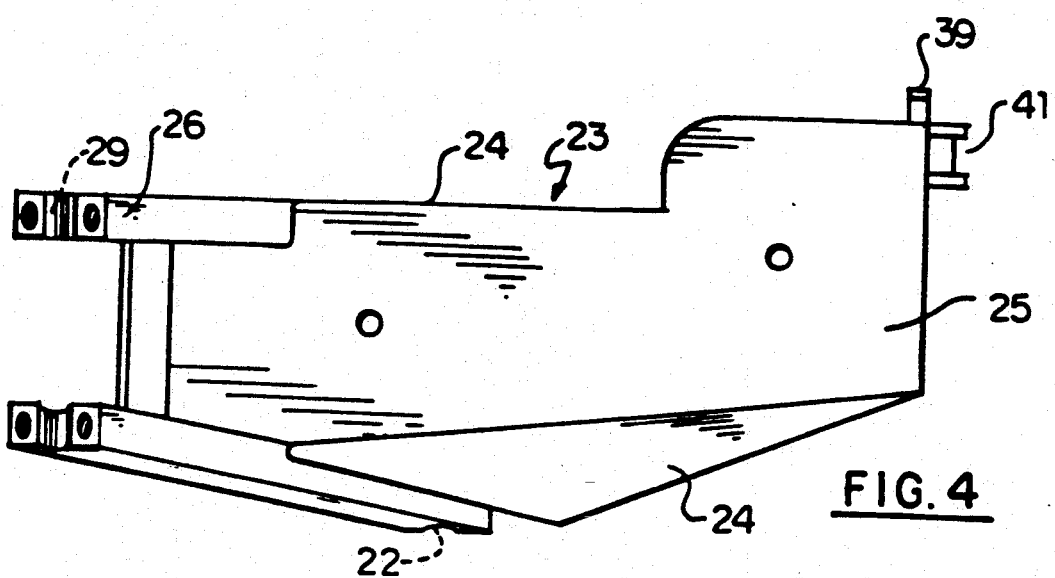
FIG. 4 is a top plan view of the main saddle per se.
Figure 5:
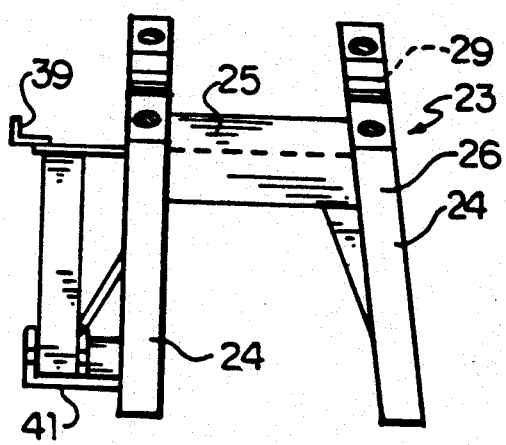
FIG. 5 is a front view of FIG. 4.
Figure 6:
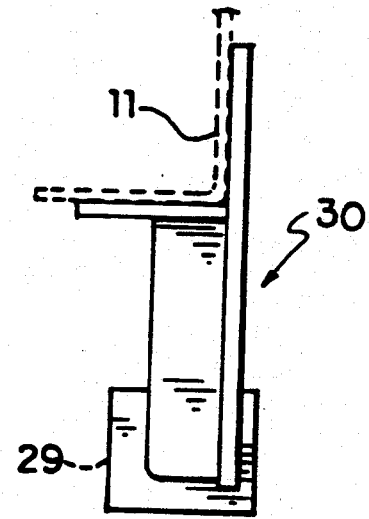
FIG. 6 is a front view of the frame bracket per se.

The saddle component includes a pair of spaced and parallel side plates 24 and a top plate 25 extending between the uppersides of the side plates and reference should be made to FIGS. 4 and 5.

A diagonal portion which acts as a bearing carrying portion 26 is formed integrally with the front of the side plates and inclines upwardly and forwardly relative thereto as clearly shown in FIG. 1. A lower bearing cap 27 bearingly secures the pivot 22 within the lower end thereof and a further bearing cap 28 bearingly secures a pivot 29 in the upper end thereof.

Both of these bearing assemblies consist of conventional rubber isolated pin self-compressing type bearings, the construction of which is conventional.

Pivot 29 connects the saddle to a frame bracket collectively designated 30 which attaches the saddle and walking beam assembly to the chassis members 11 and 12 one upon each side thereof.

Figure 7:
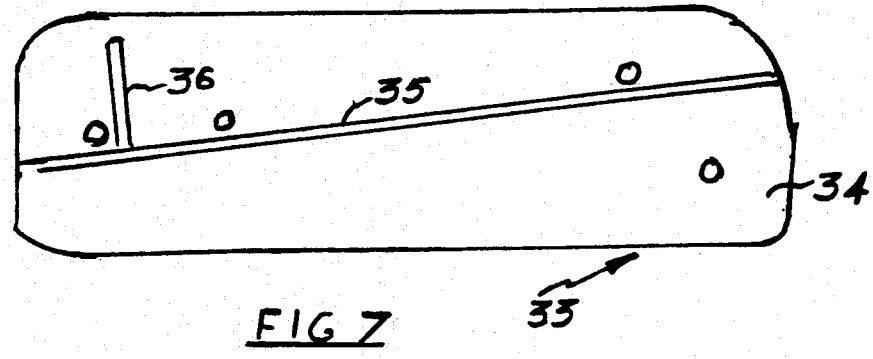
FIG. 7 is a top plan view of the air bag chassis attachment plate per se.

The upper plate 25 of the saddle component 23 includes supports 31 for conventional air bags 32 which are mounted thereon and which in turn are secured by the upper ends thereof to a top plate assembly collectively designated 33. This plate includes the bag mounting plate portion 34 and a frame attaching flange 35 which extends vertically upwardly from the plate 34 and is braced by fin 36 shown in FIG. 7.

This plate is bolted to the side of the chassis member as clearly shown in FIG. 1. The air bags are operatively connected to the pneumatic system of the truck or trailer and controlled by means of conventional bag valves shown schematically in FIG. 2 by reference character 37 operated by a rod 38 extending upwardly from the height control valve rod mount 39 extending from one side of the rear of the saddle 23 (See FIG. 1).

Shock absorber assemblies 40 are connected by one end to a bracket 41 extending downwardly from the rear of the saddle assembly 25 and these shock absorbers extend upwardly and rearwardly to be pivotally attached to a bracket 42 which in turn is secured to the vertical surface of the chassis frame members 11 and 12 respectively. Reference to FIG. 2 will also show linear stabilizers collectively designated 43 which are pivotally secured by one end to brackets 44 in turn supported upon frame member 11 and which extend to a further pivotal connection on bracket 45 secured to the axle casings 19 adjacent to and spaced inwardly from the opposite frame or chassis member 12. The bearing connections of the linear stabilizers to the frame and to the axle casings are conventional rubber bushings.

When retro-fitting an assembly, it is only necessary to remove the walking beam assembly from the chassis and discard the conventional steel springs.

Front brackets 30 and bag upper plates 33 are bolted to the chassis members 11 and 12 together with the bracket 42 for the shock absorbers and the saddle assemblies 23 are secured to the ends of the pivot rod 22 extending between the two walking beams 21. The end caps 27 are secured and the air bags 32 are installed.

The entire assembly is then offered up to and secured to the chassis firstly by securement of the air bags and secondly by placement of the upper bearing cap 28 around pivots 29 which secures the front end of the assemblies to the front brackets 30.

The shock absorbers 40 are installed together with the linear stabilizers and the operating rods 38 are connected to brackets 39 whereupon the air bags are inflated the desired amount and the apparatus is ready for use.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A walking beam wheel assembly for trucks, trailers and the like which include spaced and parallel, longitudinally extending chassis members;

said walking beam wheel assembly comprising in combination a ground engaging wheel trolley component including a pair of spaced and parallel transversely extending wheel axles with ground engaging wheels on each end thereof, a longitudinally extending walking beam extending between the wheels on each said end of said axles and means operatively connecting said walking beams one to each of said chassis members, said means including at least one air bag operatively extending between each of walking beams and the corresponding chassis member and means to mount said air bags between said walking beams and said chassis, said mount means including a saddle secured to the underside of each said air bags, a frame bracket secured to said chassis member, pivot means connecting said frame bracket to said saddle, further pivot means securing said walking beam to said saddle and means mounting the uppersides of said air bags to the underside of said chassis member, said saddle including a pair of substantially vertical side plates and an upper transverse plate extending between the uppersides of said side plates and a bearing carrying portion situated diagonally on the front end of said side plates and extending forwardly and upwardly from the underside of said side plates.

2. The assembly according to claim 1 in which said further pivot means extends transversely between said walking beams.

3. The assembly according to claim 2 in which said saddle includes means to mount said air bags and height control valve means extending between said saddle and said air bags.

4. The assembly according to claim 3 which includes at least one shock absorber operatively connected between said saddle and said chassis.

5. The assembly according to claim 3 in which said frame bracket is bearingly supported within the upper forward end of said bearing carrying portion.

6. The assembly according to claim 5 in which said pivot means connecting said frame bracket to said saddle is situated forwardly and in a horizontal plane above said further pivot means securing said walking beam to said saddle.

7. The assembly according to claim 2 which includes at least one shock absorber operatively connected between said saddle and said chassis.

8. The assembly according to claim 2 in which said frame bracket is bearingly supported within the upper forward end of said bearing carrying portion.

9. The assembly according to claim 8 in which said pivot means connecting said frame bracket to said saddle is situated forwardly and in a horizontal plane above said further pivot means securing said walking beam to said saddle.

10. The assembly according to claim 1 in which said saddle includes means to mount said air bags and height control valve means extending between said saddle and said air bags.

11. The assembly according to claims 1, 2 or 10 which includes a linear stabilizer extending transversely between one chassis member and each of said axles, one end of said stabilizers being pivotally secured to said one chassis member, the other ends of said stabilizers being pivotally secured to said axles inboard to and adjacent the other of said chassis members.

12. The assembly according to claim 10 which includes at least one shock absorber operatively connected between said saddle and said chassis.

13. The assembly according to claim 10 in which said frame bracket is bearingly supported within the upper forward end of said bearing carrying portion.

14. The assembly according to claim 13 in which said pivot means connecting said frame bracket to said saddle is situated forwardly and in a horizontal plane above said further pivot means securing said walking beam to said saddle.

15. The assembly according to claim 1 which includes at least one shock absorber operatively connected between said saddle and said chassis.

16. The assembly according to claims 1, 3, 7 or 15 which includes a linear stabilizer extending transversely between one chassis member and each of said axles, one end of said stabilizers being pivotally secured to said one chassis member, the other ends of said stabilizers being pivotally secured to said axles inboard to and adjacent the other of said chassis members.

17. The assembly according to claim 1 in which said frame bracket is bearingly supported within the upper forward end of said bearing carrying portion.

18. The assembly according to claims 7, 12, 15 or 17 which includes a linear stabilizer extending transversely between one chassis member and each of said axles, one end of said stabilizers being pivotally secured to said one chassis member, the other ends of said stabilizers being pivotally secured to said axles inboard to and adjacent the other of said chassis members.

19. The assembly according to claim 1 in which said pivot means connecting said frame bracket to said saddle is situated forwardly and in a horizontal plane above said further pivot means securing said walking beam to said saddle.

* * * * *